June 26, 1945.    C. T. BOLINGER    2,379,214
PORTABLE MIRROR EQUIPMENT
Filed May 29, 1944    2 Sheets-Sheet 1

Inventor

Catherine T. Bolinger

By Clarence A. O'Brien
and Harvey B. Jacobson
Attorneys

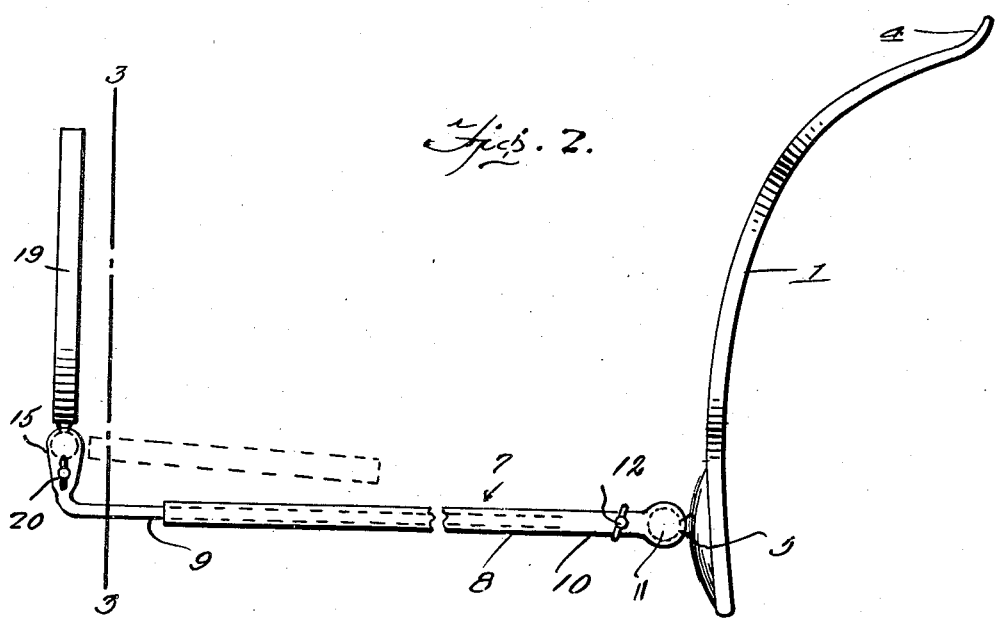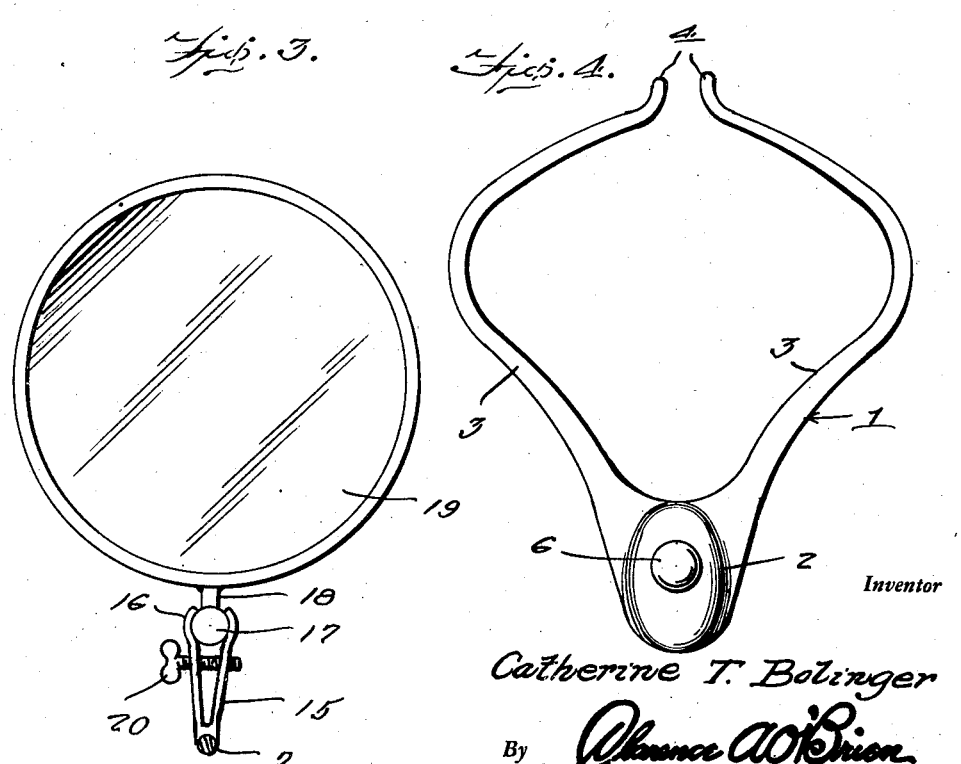

Patented June 26, 1945

2,379,214

UNITED STATES PATENT OFFICE 2,379,214

PORTABLE MIRROR EQUIPMENT

Catherine T. Bolinger, Middle River, Md.

Application May 29, 1944, Serial No. 537,812

1 Claim. (Cl. 88—101)

My invention relates to improvements in portable mirror equipment, the principal object in view being to provide a mirror with a mounting adapted for attachment to the neck of a wearer for supporting the mirror in front of the face and which provides for easy adjustment of the mirror both toward and from the face and also universally into different planes, as occasion may require, may be folded compactly, with the mirror, when not in use, is particularly adapted to be used with comfort, is simple in construction and easy to adjust, will not get out of order, and is inexpensive to manufacture.

Other and subordinate objects are also comprehended by my invention, all of which, together with the precise nature of my improvements, will be readily understood when the succeeding description and claims are read with reference to the drawings accompanying and forming part of this specification.

Figure 1:
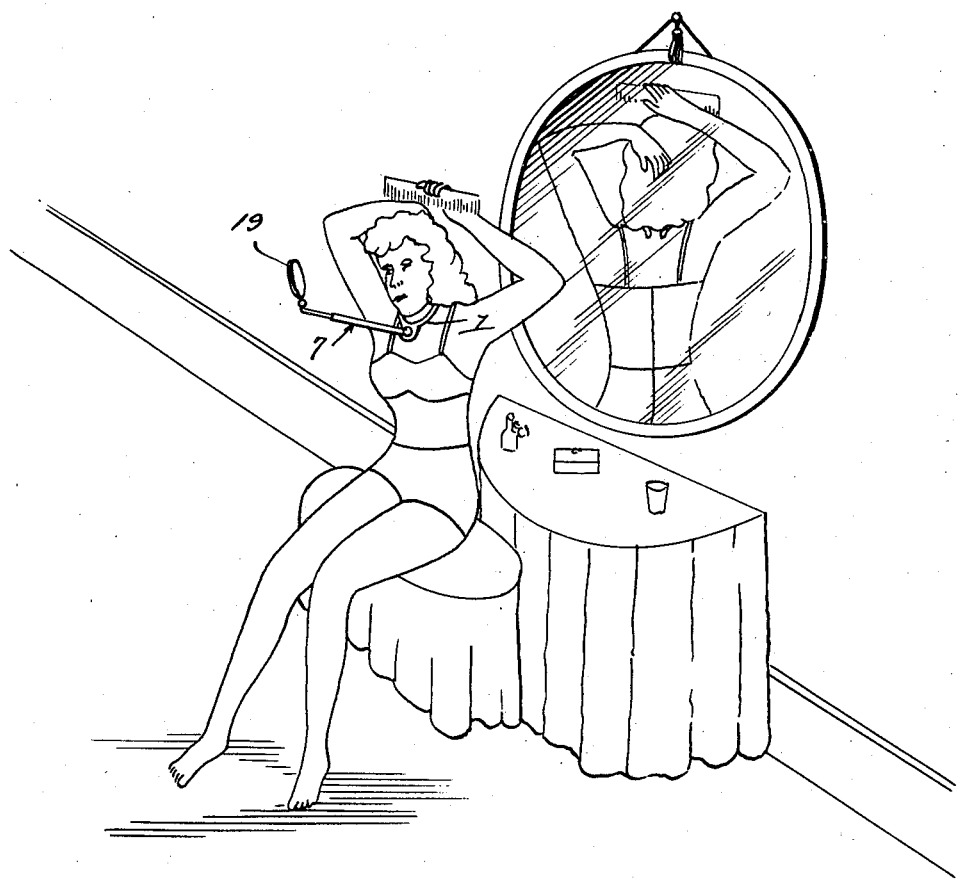
Figure 5:
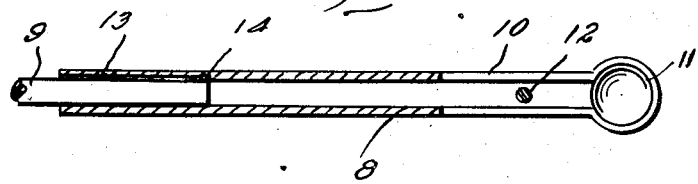

In said drawings:

Figure 1 is a view in perspective illustrating the manner in which my improved mirror equipment is used, Figure 2 is a view in side elevation of the mirror equipment showing the mirror folded in dotted lines, Figure 3 is a view in vertical section taken on the line 3—3 of Figure 2 and drawn to an enlarged scale, Figure 4 is a view in front elevation of the neck yoke, Figure 5 is a fragmentary view in longitudinal section of the bracket arm.

Referring to the drawings by numerals, my improved mirror equipment comprises, in its preferred embodiment, a neck yoke 1 preferably formed of resilient plastic, and which is substantially pear-shaped in plan and comprises a solid lower end 2 and a pair of yoke arms 3 flaring upwardly from said end 2 for a portion of their length and then curving toward each other with reversely curved terminals 4 slightly spaced apart normally. As shown in Figure 2, the yoke 1 is curved longitudinally to conform with the shoulders and lie flat on the chest of a wearer. A stud 5 extends forwardly from the end 2 of the neck yoke 1 and terminates in a ball 6 on which is mounted, as presently described, a forwardly extending bracket arm 7 comprising a tubular section 8 and a rod section 9 both formed, preferably, of resilient plastic also.

The tubular section 8 has a longitudinally split rear end portion 10 terminating in a pair of enlarged cup-like sockets 11 fitting the ball 6 and forming therewith a universal joint. A thumb screw 12 extended through the portion 10 of the section 8 provides for tightening the sockets 11 against the ball 6 to lock said joint. A longitudinal internal groove 13 is provided in the section 8 for a purpose presently seen.

The rod section 9 is provided at its inner end with a radial lug 14 slidably fitting in the groove 13 whereby said rod section is prevented from turning in the tubular section 8. At its outer end, said rod section 9 terminates in a pair of flattened, upstanding, clamping fingers 15 provided with concave ends 16 adapted to clamp a ball 17 therebetween which is formed on a stud 18 depending from a suitable mirror 19. As will be seen, the clamping fingers 15 form with the ball 17 a universal joint between the mirror 19 and said rod section 9. The thumb screw 20 extending through the clamping fingers 15 provides for clamping said fingers against said ball 17 and locking the corresponding universal joint.

The manner in which my described invention is designed to be used and operated will be readily understood. The neck yoke 1 is applied by spreading the arms apart so that the same may straddle the neck of the wearer and partially close about the neck. The bracket arm 7 may be adjusted into any desired angular position by loosening the thumb screw 11, adjusting said bracket arm on the ball 6 and then tightening said screw to lock said bracket arm in adjusted position. The rod section 9 of the bracket arm 7 may be extended or retracted, as desired, and since it is frictionally fitted in the tubular section 8, will remain in adjusted position. The mirror 19 may be adjusted as desired by loosening the thumb screw 20, adjusting the mirror, and then tightening said screw. When the equipment is not in use, the rod section 9 may be retracted in the tubular section 8, the bracket arm swung on the ball 6 alongside the neck yoke 1, and the mirror 19 swung in the clamping fingers 15 in between said bracket arm and said neck yoke. In folding the equipment, the mirror 19 is preferably folded first into the dotted line position shown in Figure 2 in which position it will lie intermediate the bracket arm 7 and neck yoke 1 when the bracket arm 7 is folded as described.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

In a portable mirror equipment, a neck yoke including a lower end adapted to lie against the chest, a bracket arm mounted at one end on said end of the yoke for universal swinging adjustment into different set positions, and a mirror mounted on the other end of said arm for universal adjustment thereon, said yoke having a pair of resilient arms curved longitudinally to fit the chest and extend over the shoulders, said arms flaring upwardly from said lower end for a portion of their length and then curving toward each other with reversely curved terminals, whereby the arms are adapted for spanning and fitting around the neck.

CATHERINE T. BOLINGER.